United States Patent [19]
Gujarathi et al.

[11] Patent Number: 5,583,173
[45] Date of Patent: Dec. 10, 1996

[54] PROCESS FOR PREPARING STYRENE-BUTADIENE RUBBER

[75] Inventors: Ramesh N. Gujarathi, Munroe Falls; Gregory J. Rogerson, Akron, both of Ohio

[73] Assignee: The Goodyear Tire & Rubber Company, Akron, Ohio

[21] Appl. No.: 419,580

[22] Filed: Apr. 10, 1995

[51] Int. Cl.$^6$ .................................................. C08F 2/16
[52] U.S. Cl. ........................... 524/458; 524/836; 526/65
[58] Field of Search ....................... 524/458, 836; 526/65

[56] References Cited

U.S. PATENT DOCUMENTS

| | | | |
|---|---|---|---|
| 2,794,126 | 3/1961 | Kelley | 526/65 |
| 4,082,714 | 4/1978 | Lo Scalzo et al. | 524/836 |
| 4,130,523 | 12/1978 | Hoy et al. | 260/29.6 |
| 4,480,078 | 10/1984 | Gujarathi et al. | 526/65 |
| 4,559,374 | 12/1985 | Senyek et al. | 523/348 |
| 5,284,905 | 2/1994 | Chen et al. | 524/710 |

OTHER PUBLICATIONS

The Vanderbilt Rubber Handbook, George G. Winspear (Editor), R T Vanderbilt Company (1968) at pp. 34–57.

Primary Examiner—Peter D. Mulcahy
Attorney, Agent, or Firm—Alvin T. Rockhill

[57] ABSTRACT

This invention discloses a process for preparing a latex of styrene-butadiene rubber which comprises (1) charging water, a soap system, a free radical generator, 1,3-butadiene monomer, and styrene monomer into a first polymerization zone; (2) allowing the 1,3-butadiene monomer and the styrene monomer to copolymerize in the first polymerization zone to a monomer conversion which is within the range of about 15% to about 40% to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50% is attained to produce the latex of styrene-butadiene rubber. This technique can also be utilized to synthesize polybutadiene latex or nitrile rubber latex by emulsion polymerization with low levels of soap.

20 Claims, No Drawings

PROCESS FOR PREPARING STYRENE-BUTADIENE RUBBER

BACKGROUND OF THE INVENTION

Styrene-butadiene rubber (SBR) is widely utilized in manufacturing tires for automobiles, trucks, aircraft and other equipment. SBR can be synthesized by utilizing emulsion polymerization techniques. Typical emulsion systems employed in the synthesis of SBR contain water, an emulsifier (soap), a free radical generator, styrene monomer, and 1,3-butadiene monomer. For example, in free radical emulsion polymerization systems radicals can be generated by the decomposition of peroxides or peroxydisulfides.

Commonly employed initiators include t-butyl hydroperoxide, pinane hydroperoxide, para-menthane hydroperoxide, potassium peroxydisulfate ($K_2S_2O_8$), benzoyl peroxide, cumene hydroperoxide and azobisisobutyronitrile (AIBN). These compounds are thermally unstable and decompose at a moderate rate to release free radicals. The combination of potassium peroxydisulfate with a mercaptan such as dodecyl mercaptan is commonly used to polymerize butadiene and SBR. In hot recipes, the mercaptan has the dual function of furnishing free radicals through reaction with the peroxydisulfate and also of limiting the molecular weight of polymer by reacting with one growing chain to terminate it and to initiate growth of another chain. This use of mercaptan as a chain transfer agent or modifier is of great commercial importance in the manufacture of SBR in emulsion since it allows control of the toughness of the rubber which otherwise may limit processibility in the factory.

A standard polymerization recipe agreed on for industrial use became known as the "mutual," "standard," "GR-S" or "hot" recipe and was as follows (based upon parts by weight):

| | |
|---|---|
| Butadiene | 75.0 |
| Styrene | 25.0 |
| n-Dodecyl Mercaptan | 0.5 |
| Potassium Peroxydisulfate | 0.3 |
| Soap Flakes | 5.0 |
| Water | 180.00 |

When this standard recipe is employed in conjunction with a polymerization temperature of 50° C., the rate of conversion to polymer occurs at 5–6 percent per hour. Polymerization is terminated at 70—70 percent conversion since high conversions led to polymers with inferior physical properties, presumably because of crosslinking in the latex particle to form microgel or highly branched structures. This termination is effected by the addition of a "shortstop" such as hydroquinone (about 0.1 part by weight) which reacts rapidly with radicals and oxidizing agents. Thus the shortstop destroys any remaining initiator and also reacts with polymer free radicals to prevent formation of new chains. The unreacted monomers are then removed, first the butadiene by flash distillation at atmospheric pressure, followed by reduced pressure and then the styrene by steam stripping in a column. A dispersion of antioxidant, such as N-phenyl-β-naphthylamine (PBNA) is typically added (1.25 parts) to protect the SBR from oxidation. The latex can then be partially coagulated (creamed) by the addition of brine and then fully coagulated with dilute sulfuric acid or aluminum sulfate. The coagulated crumb is then washed, dried and baled for shipment. One of the first major improvements on the basic process was the adoption of continuous processing. In such a continuous process, the styrene, butadiene, soap, initiator and activator (an auxiliary initiating agent) are pumped continuously from storage tanks into and through a series of agitated reactors maintained at the proper temperature at a rate such that the desired degree of conversion is reached at the exit of the last reactor. Shortstop is then added, the latex is warmed by the addition of steam and the unreacted butadiene is flashed off. Excess styrene is then team-stripped off and the latex is finished, often by blending with oil, creaming, coagulating, drying and bailing.

For further details on SBR and the "standard recipe," see The Vanderbilt Rubber Handbook, George G Winspear (Editor), R T Vanderbilt Company, Inc (1968) at pages 34–57.

SUMMARY OF THE INVENTION

By employing the technique of this invention the amount of soap required to produce styrene-butadiene rubber by emulsion polymerization can be reduced by greater than 30%. This is advantageous because it reduces costs and is environmentally attractive. The styrene-butadiene rubber produced also offers advantages in that it contains lower quantities of residual soap. This reduces fatty acid bloom characteristics in final products, such as tires, and makes plies easier to adhere together during building procedures.

This invention more specifically discloses a process for preparing a latex of styrene-butadiene rubber which comprises (1) charging water, a soap system, a free radical generator, 1,3-butadiene monomer, and styrene monomer into a first polymerization zone; (2) allowing the 1,3-butadiene monomer and the styrene monomer to copolymerize in the first polymerization zone to a monomer conversion which is within the range of about 15% to about 40% to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50% is attained to produce the latex of styrene-butadiene rubber.

This technique can also be utilized to synthesize polybutadiene latex or nitrile rubber latex by emulsion polymerization with low levels of soap. This invention more specifically discloses a process for preparing a latex of polybutadiene rubber which comprises (1) charging water, a soap system, a free radical generator, and 1,3-butadiene monomer into a first polymerization zone; (2) allowing the 1,3-butadiene monomer to polymerize in the first polymerization zone to a monomer conversion which is within the range of about 15% to about 40% to produce a low conversion polymerization medium; (3) charging the low conversion polymerization medium into a second polymerization zone; (4) charging an additional quantity of 1,3-butadiene monomer into the second polymerization zone; and (5) allowing the copolymerization to continue until a monomer conversion of at least about 50% is attained to produce the latex of polybutadiene rubber.

DETAILED DESCRIPTION OF THE INVENTION

The styrene-butadiene rubber latex of this invention is synthesized utilizing a free radical emulsion polymerization technique. By employing this technique the amount of soap required to carry out the emulsion polymerization procedure can be reduced by greater than 30%.

This is carried out by adding a styrene monomer, 1,3-butadiene monomer, water, a free radical generator, and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15% to about 40% the low conversion polymerization medium is charged into a second polymerization zone. The second polymerization zone can be a reactor or a series of two or more reactors. The low conversion polymerization medium will normally be charged into the second polymerization zone at a monomer conversion level which is within the range of about 17% to about 35%. It will more preferably be charged into the second polymerization zone at a level of monomer conversion which is within the range of 20% to 30%.

Additional styrene monomer and butadiene monomer are charged into the second polymerization zone. Normally from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 percent of the total quantity of monomers charged into the second polymerization zone (from 55 percent to 70 percent of the total monomers charged will be charged into the first polymerization zone). It is generally most preferred to charge from about 35 weight percent to about 42 percent of the total quantity of monomers charged into the second polymerization zone (from 58 percent to 65 percent of the total monomers charged will be charged into the first polymerization zone). By splitting the monomer charge between the first polymerization zone and the second polymerization zone the total quantity of soap required to provide a stable latex is reduced.

The copolymerization in the second polymerization zone is allowed to continue until a monomer conversion of at least 50% is attained. The copolymerization will preferable be allowed to continue until a total monomer conversion which is within the range of 50% to 68% is realized. More preferable the copolymerization in the second reaction zone will be allowed to continue until a monomer conversion of 58% to 65% is reached.

After the desired monomer conversion is reached in the second polymerization zone the SBR latex made is removed from the second polymerization zone and a short stop is added to terminate the copolymerization. After the copolymerization has been completed and the shortstop has been added to the latex, the SBR can be recovered from the latex by using standard coagulation and drying techniques.

In synthesizing the SBR latex of this invention generally from about 10 weight percent to about 40 weight percent styrene and from about 60 weight percent to about 90 weight percent 1,3-butadiene are copolymerized. It is typically preferred for the SBR to contain from about 20 weight percent to about 30 weight percent styrene and from about 70 weight percent to about 80 weight percent 1,3-butadiene. It is normally most preferred for the SBR to contain from about 24 weight percent to about 28 weight percent styrene and from about 72 weight percent to about 76 weight percent 1,3-butadiene. Like ratios of styrene monomer and butadiene monomer will accordingly be charged into the first polymerization zone and the second polymerization zone.

Essentially any type of free radical generator can be used to initiate such free radical emulsion polymerizations. For example, free radical generating chemical compounds, ultraviolet light or radiation can be used. In order to ensure a satisfactory polymerization rate, uniformity, and a controllable polymerization, free radical generating chemical agents which are water or oil soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxides dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

The soap systems used in the polymerizations of this invention contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone in practicing this invention. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases it will be most preferred to use an amount of the soap system which is within the range of about 2.7 phm to 2.9 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. to about 65° F. It is generally preferred for the polymerization to be carried out at a temperature which is within the range of 40° F. to about 60° F. It is typically more preferred to utilize a polymerization temperature which is within the range of about 45° F. to about 55° F. To increase conversion levels, it can be advantageous to increase the temperature as the polymerization proceeds.

The SBR latex made by the process of this invention can be employed in manufacturing a wide variety of articles including tires. Since the styrene-butadiene rubber produced contains a relatively low quantity of residual soap it offers various advantages. For instance, low relative levels of residual soap in the SBR reduces fatty acid bloom characteristics in final products, such as tires. A low level of residual soap also makes plies easier to adhere together during building procedures which offers a big advantage in tire manufacturing.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1 (CONTROL)

In this experiment a SBR latex was synthesized by copolymerizing 1,3-butadiene monomer and styrene monomer by a standard continuous process. This procedure was conducted in a pilot plant which consisted of a series of five polymerization reactors. Each of the reactors used in this procedure were 30 gallon stirred reactors which were connected to operate in series (the reactor chain had a total chain volume of 150 gallons). The reactor chain was continuously operated at an actual running rate of 18.53 gallons per hour which provided an actual reaction time of 8.1 hours.

The monomers were fed into the first reactor at a rate of 48.9 pounds per hour. The monomer charge employed contained 69 weight percent 1,3-butadiene and 31 weight percent styrene. An activator solution, a soap solution, a scavenger solution, a modifier, and an initiator were also continuously changed into the first reactor.

The activator solution was an aqueous solution containing 0.67 percent sodium ferric ethylenediaminetetraacetate. It was charged into the first reactor at a rate which was sufficient to maintain a 0.026 phm level of sodium ferric ethylenediaminetetraacetate.

The soap solution contained 96.79% water, 0.19% sodium hydroxide, 0.20% potassium hydroxide, 0.59% of the potassium soap of disproportionated wood rosin, 1.10% hydrogenated mixed tallow fatty acids, 0.89% of the potassium soap of disproportionated tall oil rosin, 0.18% of the sodium salt of a condensed naphthalene sulfonic acid, 0.03% tetrapotassium pyrophosphate, 0.02% sodium formaldehyde sulfoxylate, and 0.01% sodium hydrosulfite. The soap system solution was charged into the first reactor at a rate which was sufficient to maintain a 0.341 phm level of sodium hydroxide, a 0.374 phm level of potassium hydroxide, a 1.088 phm level of the potassium soap of disproportionated wood rosin, a 2.022 phm level of hydrogenated mixed tallow fatty acids, a 1.631 phm level of the potassium soap of disproportionated tall oil rosin, a 0.335 phm level of the sodium salt of a condensed naphthalene sulfonic acid, a 0.057 phm level of tetrapotassium pyrophosphate, a 0.034 phm level of sodium formaldehyde sulfoxylate, and a 0.019 phm level of sodium hydrosulfite.

The scavenger solution contained 99.31% water, 0.096% sodium hydroxide and 0.60% sodium hydrosulfite. The scavenger solution was charged into the first reactor at a rate which was sufficient to maintain a 0.004 phm level of sodium hydroxide and a 0.026 phm level of sodium hydrosulfite (the total level of sodium hydrosulfite was 0.045 phm).

The modifier charged into the first reactor was t-dodecyl mercaptan. It was charged into the reactor at a rate of 0.137 phm. The initiator charged into the first reactor was pinane hydroperoxide and it was charged at a rate of 0.087 phm.

In this procedure the polymerization was terminated by adding a mixture of diethylhydroxylamine and sodium dimethyldithiocarbamate to the latex as a shortstop after it exited the fifth reactor. The latex made by this procedure was stable. However, stable latices could not be made if the level of soap added to the first reactor was reduced.

EXAMPLE 2

In this experiment the equipment and procedure described in Example 1 were repeated except that the monomer charge was split with some of the monomer being charged into the third reactor. In this procedure 29.6 pounds per hour of monomer were continuously charged into the first reactor and 19.1 pounds per hour of monomer were continuously charged into the third reactor. This allowed for the total level of soap to be reduced by about 40%.

In this experiment the soap solution charged into the first reactor contained 98.0% water, 0.25% potassium hydroxide, 0.13% potassium chloride, 0.0% of the potassium soap of disproportionated wood rosin, 1.18% hydrogenated mixed tallow fatty acids, 0.28% of the potassium soap of disproportionated tall oil rosin, 0.12% of the sodium salt of a condensed naphthalene sulfonic acid, 0.02% tetrapotassium pyrophosphate, 0.02% sodium formaldehyde sulfoxylate, and 0.01% sodium hydrosulfite. The soap system solution was charged into the first reactor at a rate which was sufficient to maintain a 0.435 phm level of potassium hydroxide, a 0.230 phm level of potassium chloride, a 0.0 phm level of the potassium soap of disproportionated wood rosin, a 2.076 phm level of hydrogenated mixed tallow fatty acids, a 0.492 phm level of the potassium soap of disproportionated tall oil rosin, a 0.206 phm level of the sodium salt of a condensed naphthalene sulfonic acid, a 0.035 phm level of tetrapotassium pyrophosphate, a 0.035 phm level of sodium formaldehyde sulfoxylate, and a 0.019 phm level of sodium hydrosulfite.

In this procedure 0.503 phm of an aqueous solution of Witconate® 1223L the sodium salt of a linear alkylbenzene sulfonic acid (from Witco Chemicals) was also charged into the first reactor as a secondary surfactant. The level of pinane hydroperoxide initiator was also increased to 0.110 phm.

The SBR latex made utilizing this procedure proved to be stable. The level of residual soap in the SBR recovered from the latex was also reduced.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a latex of styrene-butadiene rubber which comprises (1) charging water, a soap system, a free radical generator, and a monomer mixture which consists of 1,3-butadiene monomer and styrene monomer into a first polymerization zone, wherein the soap system is comprised of a fatty acid soap and a rosin acid soap, and wherein the weight ratio of the fatty acid soap to the rosin acid soap is within the range of about 50:50 to about 90:10; (2) allowing the 1,3-butadiene monomer and the styrene monomer to copolymerize in the first polymerization zone to a monomer conversion which is within the range of about 15% to about 40%, based upon charged monomer, to produce a low conversion polymerization medium; (3) charging the low conversion polymerization medium into a second polymerization zone; (4) charging an additional quantity of 1,3-butadiene monomer and an additional quantity of styrene monomer into the second polymerization zone; (5) allowing the copolymerization to continue until a monomer conversion of at least about 50% is attained to produce the latex of styrene-butadiene rubber, wherein the quantity of soap employed in said process is less than about 3.5 phm.

2. A process as specified in claim 1 wherein the 1,3-butadiene monomer and the styrene monomer are copolymerized in step (2) to a monomer conversion which is within the range of about 17 percent to about 35 percent.

3. A process as specified in claim 2 wherein from about 20 weight percent to about 50 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

4. A process as specified in claim 3 wherein the monomer charge contains from about 10 weight percent to about 40 weight percent styrene and from about 60 weight percent to about 90 weight percent 1,3-butadiene.

5. A process as specified in claim 4 wherein the copolymerization is conducted at a temperature which is within the range of about 35° F. to about 65° F.

6. A process as speicifed in claim 5 wherein the copolymerization in step (5) is allowed to continue until a monomer conversion which is within the range of about 50 percent to about 68 percent is attained.

7. A process as specified in claim 6 wherein the quantity of soap employed is within the range of about 2.5 phm to about 3.2 phm.

8. A process as specified in claim 7 wherein the 1,3-butadiene monomer and the styrene monomer are copolymerized in step (2) to a monomer conversion which is within the range of about 20 percent to about 30 percent.

9. A process as specified in claim 8 wherein from about 30 weight percent to about 45 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

10. A process as specified in claim 9 wherein the monomer charge contains from about 20 weight percent to about 30 weight percent styrene and from about 70 weight percent to about 80 weight percent 1,3-butadiene.

11. A process as specified in claim 10 wherein the copolymerization is conducted at a temperature which is within the range of about 40° F. to about 60° F.

12. A process as specified in claim 11 wherein the free radical generator is a peroxygen compound.

13. A process as specified in claim 11 wherein the free radical generator is selected from the group consisting of potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, 2,2-bis-(t-butylperoxy)butane, ethyl 3,3-bis(t-butylperoxy)butyrate, and 1,1-di-(t-butylperoxy) cyclohexane.

14. A process as specified in claim 11 wherein the free radical generator is selected from the group consisting of potassium persulfate, ammonium persulfate, and pinane hydroperoxide.

15. A process as specified in claim 11 wherein from about 35 weight percent to about 42 weight percent of the total quantity of 1,3-butadiene monomer and styrene monomer charged is charged into the second polymerization zone, based upon the total quantity of 1,3-butadiene monomer and styrene monomer charged into the first polymerization zone and the second polymerization zone.

16. A process as specified in claim 15 wherein the monomer charge contains from about 24 weight percent to about 28 weight percent styrene and from about 72 weight percent to about 76 weight percent 1,3-butadiene.

17. A process as specified in claim 16 wherein the copolymerization is conducted at a temperature which is within the range of about 45° F. to about 55° F. and wherein the total level of soap persent is within the range of about 2.7 phm to 2.9 phm.

18. A process as specified in claim 15 wherein the quantity of soap employed is within the range of about 2.6 phm to about 3.0 phm.

19. A process for preparing a latex of polybutadiene rubber which comprises (1) charging water, a soap system, a free radical generator, and a monomer charge which consists of 1,3-butadiene monomer into a first polymerization zone, wherein the soap system is comprised of a fatty acid soap and a rosin acid soap, and wherein the weight ratio of the fatty acid soap to the rosin acid soap is within the range of about 50:50 to about 90:10; (2) allowing the 1,3-butadiene monomer to polymerize in the first polymerization zone to a monomer conversion which is within the range of about 15% to about 40%, based upon charged monomer, to produce a low conversion polymerization medium; (3) charging the low conversion polymerization medium into a second polymerization zone; (4) charging an additional quantity of 1,3-butadiene monomer into the second polymerization zone; and (5) allowing the copolymerization to continue until a monomer conversion of at least about 50% is attained to produce the latex of polybutadiene rubber, wherein the quantity of soap employed in said process is less than about 3.5 phm.

20. A process as specified in claim 4 wherein the weight ratio of the fatty acid soap to the rosin acid soap is within the range of about 60:40 to about 85:15.

* * * * *